US012214322B2

(12) United States Patent
Shalev et al.

(10) Patent No.: US 12,214,322 B2
(45) Date of Patent: Feb. 4, 2025

(54) CARBONATION MACHINE WITH ROTATABLE CARBONATION HEAD

(71) Applicant: Sodastream Industries Ltd., Kfar Saba (IL)

(72) Inventors: Oren Shalev, Ashdod (IL); Avi Cohen, Tel-Aviv (IL); Michael Bursak, Tirat Karmel (IL); Allan Ring, Mercaz Shapira (IL); Hagai Harduff, Binyamina (IL); Doron Krom, Zichron Yaakov (IL); Eyal Shmueli, Modiin (IL); Michael Tsinzovsky, Holon (IL)

(73) Assignee: Sodastream Industries Ltd., Kfar Saba (IL)

( * ) Notice: Subject to any disclaimer, the term of this patent is extended or adjusted under 35 U.S.C. 154(b) by 752 days.

(21) Appl. No.: 17/340,092

(22) Filed: Jun. 7, 2021

(65) Prior Publication Data

US 2022/0387942 A1 Dec. 8, 2022

(51) Int. Cl.
*B01F 3/04* (2006.01)
*B01F 23/231* (2022.01)
*B01F 23/2361* (2022.01)
*B01F 35/42* (2022.01)
*B01F 23/236* (2022.01)
*B01F 23/237* (2022.01)

(52) U.S. Cl.
CPC .... *B01F 23/23122* (2022.01); *B01F 23/2361* (2022.01); *B01F 35/42* (2022.01); *B01F 23/2364* (2022.01); *B01F 23/237621* (2022.01)

(58) Field of Classification Search
CPC ............ B01F 23/23122; B01F 23/2361; B01F 23/237621; B01F 23/2364; B01F 35/42
USPC ........................................................ 99/323.1
See application file for complete search history.

(56) References Cited

U.S. PATENT DOCUMENTS 4,082,123 A * 4/1978 Haythornthwaite ........................ B01F 33/5014 141/97
4,610,282 A * 9/1986 Brooks .............. B01F 33/5014 426/477

(Continued)

FOREIGN PATENT DOCUMENTS

WO WO-2015144639 A1 * 10/2015 ........... B01F 13/042
WO WO/2020169347 8/2020

*Primary Examiner* — Omar Flores Sanchez
(74) *Attorney, Agent, or Firm* — PEARL COHEN ZEDEK LATZER BARATZ LLP

(57) ABSTRACT

A carbonation machine includes a rotatable carbonation head including at least one pressure release valve, a carbonation tube connectable via piping to a gas canister and a flange for engaging a neck of a bottle filled with liquid to be carbonated by screwing the neck into or onto the flange to firmly hold the bottle with the carbonation tube maintained inside the bottle, and for disengaging the neck of the bottle from the flange by unscrewing the neck off the flange. The rotatable carbonation head is configured, when screwing the neck into or onto the flange, to be rotated from a release position to a lock position, and is configured, when unscrewing the neck off the flange, to be rotated from the lock position to the release position. In the release position said at least one pressure release valve is operated to open so as to release excess pressure if such excess pressure exists in the bottle, and in the lock position said at least one pressure valve remains closed.

20 Claims, 9 Drawing Sheets

(56) References Cited

U.S. PATENT DOCUMENTS

| | | | | |
|---|---|---|---|---|
| 8,455,032 | B2 * | 6/2013 | Gormley | A23L 2/54 222/394 |
| 11,751,585 | B1 * | 9/2023 | Anthony | A47J 31/40 99/275 |
| 2013/0037969 | A1 * | 2/2013 | Ring | A23L 2/54 141/69 |
| 2013/0089645 | A1 * | 4/2013 | Leung | B01F 23/2361 261/38 |
| 2014/0097549 | A1 * | 4/2014 | Hoare | B01F 35/2112 261/64.3 |
| 2015/0367296 | A1 * | 12/2015 | Cohen | A23L 2/54 261/65 |
| 2017/0165619 | A1 * | 6/2017 | Krom | B65D 45/322 |
| 2019/0015797 | A1 * | 1/2019 | Asis | A23L 2/54 |
| 2022/0410100 | A1 * | 12/2022 | Donaghey | B01F 35/422 |
| 2023/0146835 | A1 * | 5/2023 | Baudtler | B01F 23/237621 261/42 |
| 2023/0285912 | A1 * | 9/2023 | Waisman | B01F 35/7176 |
| 2023/0363575 | A1 * | 11/2023 | Anthony | A47J 31/461 |

* cited by examiner

CARBONATION MACHINE WITH ROTATABLE CARBONATION HEAD

FIELD OF THE INVENTION

The present invention relates to carbonation machines. More particularly, the present invention relates to a carbonation machine with a rotatable carbonation head and a pressure release feature.

BACKGROUND OF THE INVENTION

Carbonation machines are commonly used in homes, offices, cafeterias, and other settings. A typical carbonation machine may be operated to carbonate water or another liquid by injecting carbon dioxide into the water or the other liquid that is in a bottle that may be attached to the machine. Other types of carbonation machines may be configured to dispense carbonated beverages into cups or other containers.

The carbon dioxide gas that is injected into liquid to carbonate the liquid is typically provided in canisters of compressed or liquefied gas. The carbonation machine includes a user-operable mechanism for releasing gas from the cylinder and conducting the gas to the liquid to be carbonated. Typically, operation of the gas release mechanism causes the mechanism to open a valve of the cylinder. When the gas canister is installed in the carbonation machine, a valve head that includes the valve is connected to a gas canister connector of the carbonation machine.

In order for water or another liquid (hereinafter—water, for brevity) to be carbonated, a bottled filled with liquid is linked to the carbonation head of the carbonation machine, and, once the bottle is firmly attached to the carbonation head, the user may press a lever or otherwise activate the carbonation process, during which compressed carbon dioxide from the canister is directed into the bottle via tubing and controllable valves. When the carbonation is completed, the bottle is released from the carbonation head, but not before excess pressure within the bottle is released, typically by a controlled pressure release valve. The release of excess pressure is required in order to avoid uncontrolled release and undesired jetting of the bottle out of the carbonation machine when it is disengaged from the carbonation head.

There are various known mechanisms for releasing excess pressure from a bottle with carbonated liquid, after the completion of carbonation. One such mechanism involves tilting of the bottle, that was previously (before carbonation) screwed into carbonation position onto the carbonation machine, with the carbonated liquid in order to actuate a pressure release valve, before the bottle is unscrewed and disengaged from the carbonation head. Another known mechanism for releasing excess pressure is incorporated in a carbonation head that has a pronged clamp. The prongs are used to hold the bottle, and a restricting ring holds the prongs in position, thereby preventing inadvertent release of the bottle, while carbonation take place. When carbonation is finished, the mechanism is configured to release excess pressure before the prongs are freed to allow the bottle to be removed from the carbonation head.

SUMMARY OF THE INVENTION

There is thus provided, in accordance with an embodiment of the invention, a carbonation machine that includes a rotatable carbonation head including at least one pressure release valve, a carbonation tube connectable via piping to a gas canister and a flange for engaging a neck of a bottle filled with liquid to be carbonated by screwing the neck into or onto the flange to firmly hold the bottle with the carbonation tube maintained inside the bottle and for disengaging the neck of the bottle from the flange by unscrewing the neck off the flange. The rotatable carbonation head is configured, when screwing the neck into or onto the flange, to be rotated from a release position to a lock position, and is configured, when unscrewing the neck off the flange, to be rotated from the lock position to the release position. In the release position, said at least one pressure release valve is operated to open so as to release excess pressure if such excess pressure exists in the bottle, and in the lock position, said at least one pressure valve remains closed.

According to some embodiments of the invention, the at least one pressure release valve includes two pressure release valves.

According to some embodiments of the invention, the carbonation machine includes an activator to operating said at least one pressure release valve.

According to some embodiments of the invention, the activator is configured to operate said at least one pressure release valve by depressing a plunger of each of said at least one pressure release valves.

According to some embodiments of the invention, a cam is provided adjacent to the rotatable carbonation head that includes at least one inclined wall defining a tapered space between the cam and the plunger of each of said at least one pressure valve that comes into physical contact with the plunger, when the carbonation head is in the release position.

According to some embodiments of the invention, the carbonation head is confined when rotated to a swivel sector.

According to some embodiments of the invention, the carbonation head is in a release position when the carbonation head is rotated to a first end of the swivel sector.

According to some embodiments of the invention, the carbonation head is in the lock position when the carbonation head is rotated away from the first end of the swivel sector.

According to some embodiments of the invention, the carbonation head is in the lock position when the carbonation head is rotated to a second end of the swivel sector.

According to some embodiments of the invention, a plurality of locking teeth is provided to clutch to a rim protruding laterally from the neck of the bottle, when the carbonation head is in the lock position.

According to some embodiments of the invention, the carbonation machine includes a wall surface surrounding the flange, for preventing retraction of the locking teeth, and retaining the neck clutched by the locking teeth.

According to some embodiments of the invention, recesses are provided in the wall surface surrounding the flange, such that, when the carbonation head is rotated to the release position, the locking teeth are allowed to retract into the recesses and release the laterally protruding rim of the neck of the bottle.

According to some embodiments of the invention, a stopper is provided coupled to the rotatable carbonation head, confined to move within a groove, wherein opposite ends of the groove define the lock position and the release position.

According to some embodiments of the invention, the groove is provided with a first indent in a periphery of the groove such that a protrusion on the stopper may slide into the first indent when the carbonation head reaches the release position.

According to some embodiments of the invention, the groove is be provided with a second indent in a periphery of the groove such that a protrusion on the stopper may slide into the second indent when the carbonation head is rotated to the lock position.

According to some embodiments of the invention, the carbonation machine further includes a housing mounted on a base, provided with a gas canister compartment, wherein the housing includes a lateral extension suspended over the base and housing the carbonation head.

According to some embodiments of the invention, the carbonation head is configured to be rotated only when the bottle is fully screwed into or onto the flange.

According to some embodiments of the invention, the carbonation machine further includes one or a plurality of enabling teeth for facilitating rotation of the carbonation head only when the bottle is fully screwed into or onto the flange.

According to some embodiments of the invention, there is provided a rotatable carbonation head including at least one pressure release valve, a carbonation tube connectable via piping to a gas canister and a flange for engaging a neck of a bottle filled with liquid to be carbonated by screwing the neck into or onto the flange to firmly hold the bottle with the carbonation tube maintained inside the bottle, and for disengaging the neck of the bottle from the flange by unscrewing the neck off the flange, the rotatable carbonation head being configured, when screwing the neck into or onto the flange, to be rotated from a release position to a lock position, and being configured, when unscrewing the neck off the flange, to be rotated from the lock position to the release position, wherein in the release position said at least one pressure release valve is operated to open so as to release excess pressure if such excess pressure exists in the bottle, and wherein in the lock position said at least one pressure valve remains closed.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
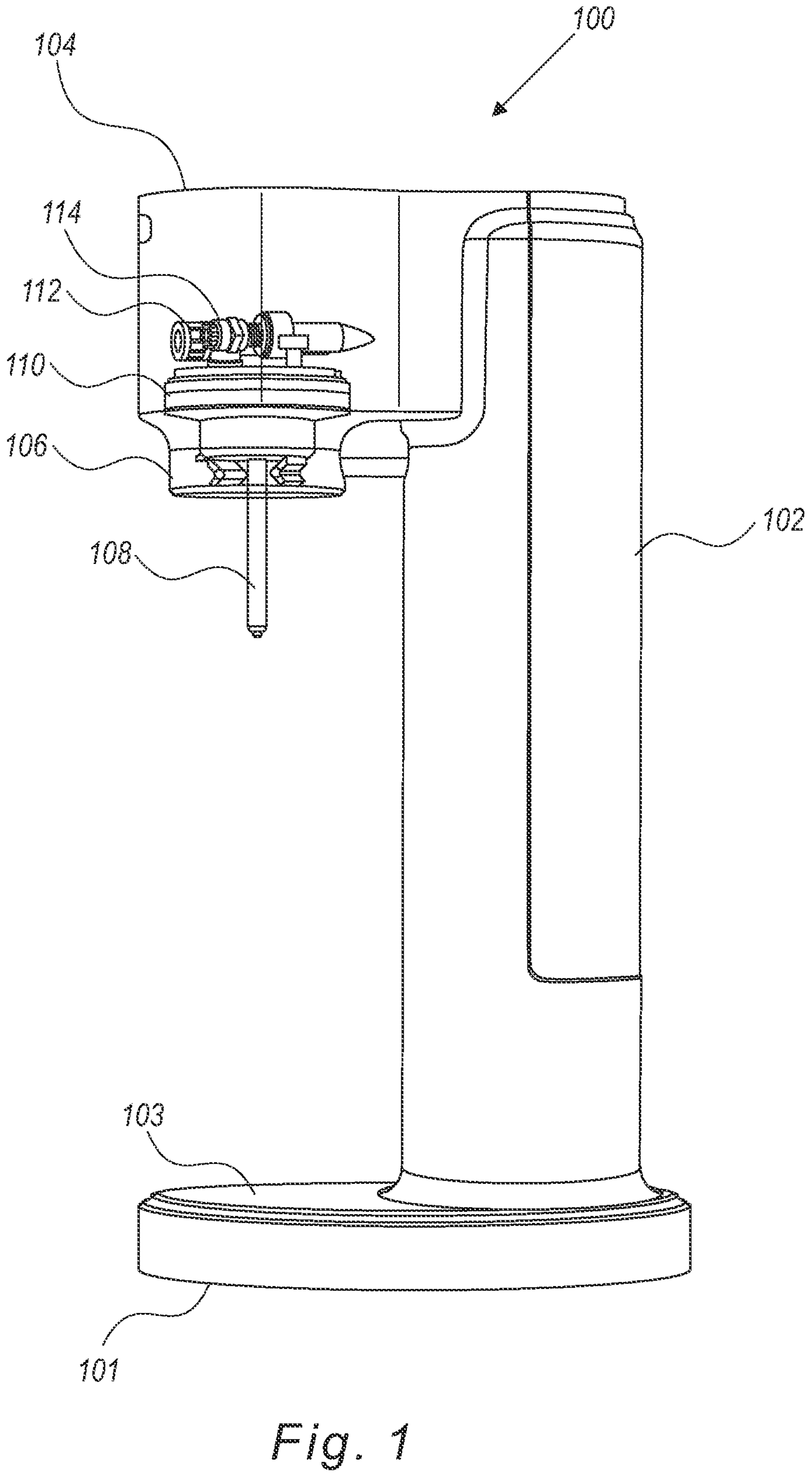
FIG. 1 is a general view of a carbonation machine with rotatable carbonation head, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In accordance with some embodiments of the present invention, a novel carbonation machine is introduced. A carbonation machine, according to some embodiments, includes a carbonation head with a mount configured to receive a bottle with liquid to be carbonated, by screwing the bottle into a lock position where carbonation may take place.

When the bottle is screwed into the mount of the carbonation head, the carbonation head is configured to swivel in the direction of the screwing action, about a predetermined swivel sector (e.g., within a range of 15-60 degrees, such as, for example, 45 degrees), bringing it to a lock position. When the bottle is in the lock position and firmly attached, the user may perform carbonation by pressing on a carbonation button or a lever, thereby causing the release of carbon dioxide (or any other carbonation gas) from a gas canister, into the carbonation bottle through designated piping that ends with a carbonation tube that is maintained inside the bottle. A restrictor may be provided so as to restrict the rotation of the carbonation head within a predetermined swivel sector, where a first end of the swivel sector, is located where the bottle is placed in a lock position and a second end of the swivel sector, opposite the first end portion, is located where the bottle is in a release position, where a controlled pressure release mechanism releases excess pressure within the bottle. Either of the end positions of the swivel sector may be at either of the distinct ends of the sector or at sub-sector end portions of the sector (e.g., allowing some movement within the sub-sector yet remaining in the lock position or in the release position). In some embodiments of the present invention, the lock position may be configured to be any position of the carbonation head along the swivel sector that is not the release position.

The carbonation head, according to some embodiments of the invention may include one or more pressure release valves, for releasing any excess pressure from the bottle after carbonation. In some embodiments of the invention, the carbonation head includes a primary pressure release valve and an additional pressure release valve acting as a safety valve to release pressure from the carbonation bottle in case the primary pressure release valve fails. The pressure release mechanism may include an activator that may be positioned adjacent to the rotatable carbonation head, to activate said one or more pressure release valves when the rotatable carbonation head is rotated back to the release position sector end.

Each of said one or more pressure release valves may include a depressable plunger mounted on the carbonation head for actuating that valve. In some embodiments of the invention, the activator may comprise a cam, e.g., an inclined wall that defines a tapered space between the cam and each of the plungers that eventually comes into physical contact with the plungers, when the carbonation head is turned and reaches the release position.

When the carbonation process is finished (e.g., the user may decide when the carbonation process is completed), the user may then unscrew the bottle by rotating it in a direction that is opposite to the direction of rotation when the bottle was screwed into the mount. When the user starts unscrewing the bottle, the carbonation head swivels back from the lock position across the swivel sector to the release position. At the release position, said one or more pressure release valves are activated to release excess pressure from the bottle. The user may further twist the bottle to further unscrew the bottle and eventually disengage it from the carbonation head mount. During the remainder of the unscrewing of the bottle, the carbonation head remains in the release position with the pressure release valves kept open.

FIG. 1 is a general view of a carbonation machine with rotatable carbonation head, in accordance with some embodiments of the present invention.

Carbonation machine 100 includes a base 101, with a generally flat support surface 103, for supporting a bottle before and/or after it is engaged to the carbonation head. A towering housing 104 is supported on base 101. Housing 104 includes a gas canister compartment 102 in which a gas canister (e.g., a gas cylinder, not shown in this figure) containing compressed carbon dioxide or other carbonation gas, in gaseous or liquified form (hereinafter—gas, for brevity), may be placed and connected to piping of and actuation mechanism (not shown in this figure) for delivering gas from the gas canister to a bottle that is filled with water or other liquid (hereinafter—water, for brevity) to carbonate the water.

A lateral extension of housing 104 is suspended over support surface 103 and houses a rotatable carbonation head 110 configured to engage with a bottle that is filled with water, by screwing the neck of the bottle into (or, alternatively, in some embodiments, onto) a flange (220, see FIG. 3) to firmly secure the bottle to the carbonation head. When the bottle is firmly secured to the carbonation head, carbonation tube 108 is maintained inside the bottle, so as to facilitate carbonating the water, by delivering the gas directly into the water. Carbonation head 110 has two pressure release valves—a first pressure release valve 112, and a second pressure release valve 114, for releasing excess pressure after carbonation is completed and before the bottle is disengaged from the carbonation head. The employment of two pressure release valves is designed to make sure that excess pressure is released even if one of the valves fails.

Figure 2:
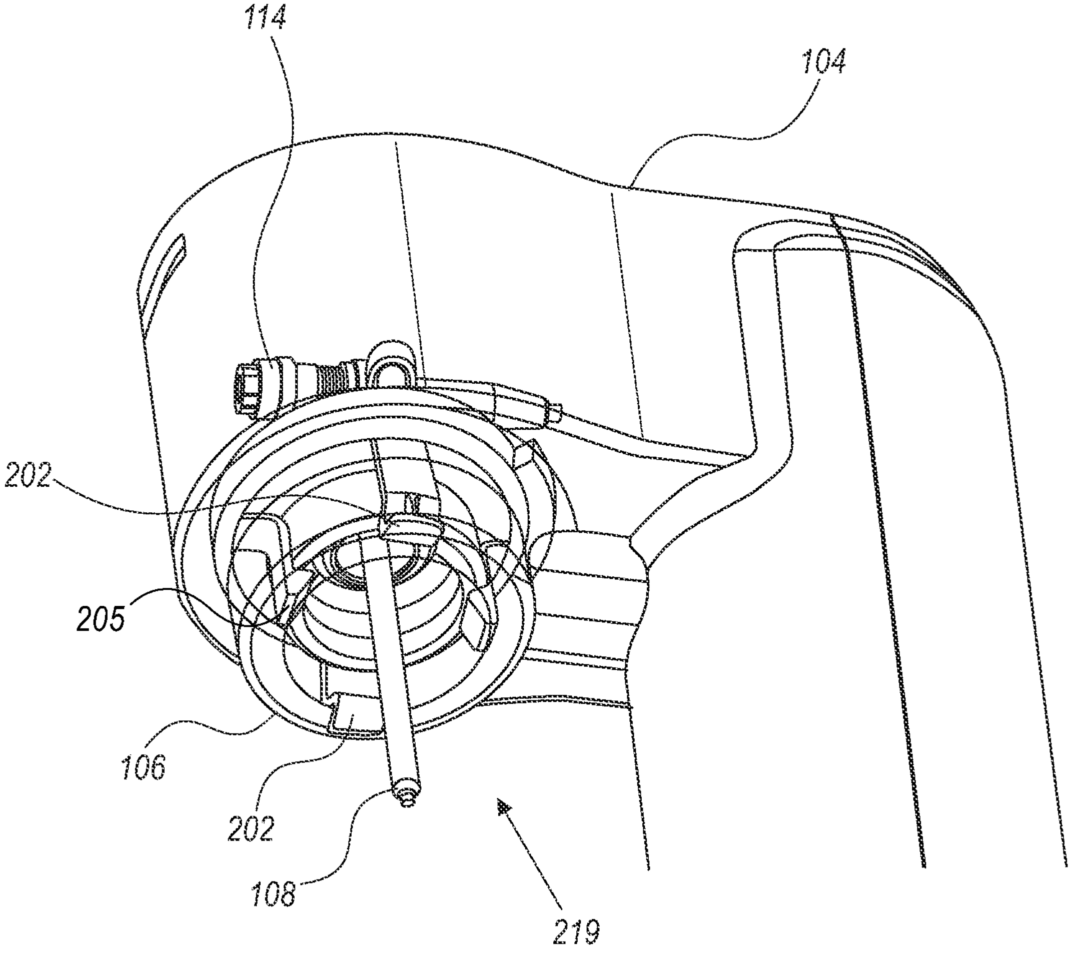
FIG. 2 is a view of a mount of a carbonation head of the carbonation machine shown in FIG. 1.

FIG. 2 is a view of a mount 106 of a carbonation head of the carbonation machine shown in FIG. 1.

Figure 3:
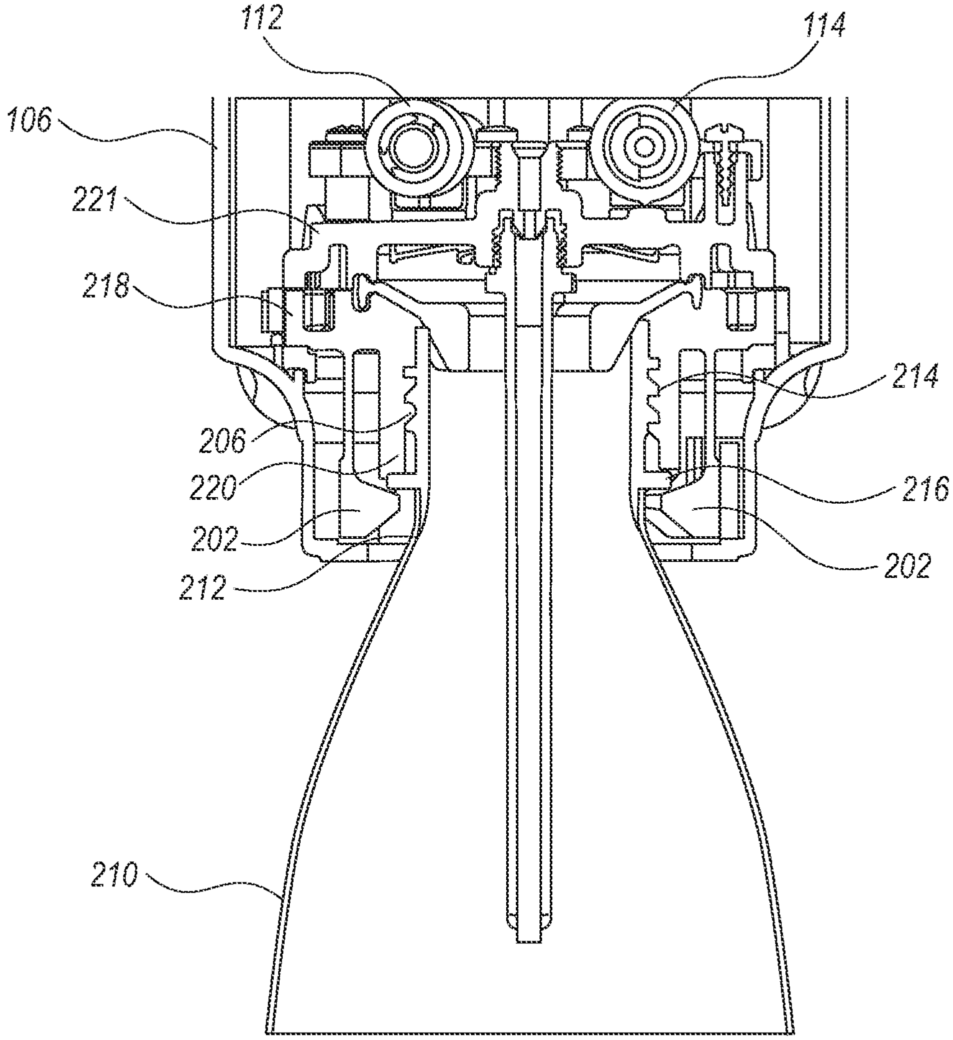
FIG. 3 is a cross-sectional view of the carbonation head of the carbonation machine shown in FIG. 1.

FIG. 3 is a cross-sectional view of the carbonation head of the carbonation machine shown in FIG. 1.

Mount 106 includes an opening 219 through which the neck 212 of a bottle 210 filled with water may be inserted and attached to the carbonization head. Neck 212 may include external thread 214 that matches internal thread 206 of flange 220. In order to add to the safety of the device, peripheral locking teeth 202 are designed to hold neck 212, by clutching to rim 216 that laterally protrudes from neck 212. Except for the release position, at any other position of the rotatable carbonation head, the internal wall surface 107 of mount 106 prevents locking teeth 202 from retracting backwards, so as to retain the neck 212 clutched by the locking teeth 202.

When the carbonation head is rotated to the release position, each of the locking teeth 202 can retract outwardly into a designated recess within mount 106, thereby allowing the insertion of the neck 212 of bottle 210 into flange 220 before the neck is screwed into the flange, or the removal of neck 212 of bottle 210, after the neck is fully unscrewed from flange 220.

Figure 4:
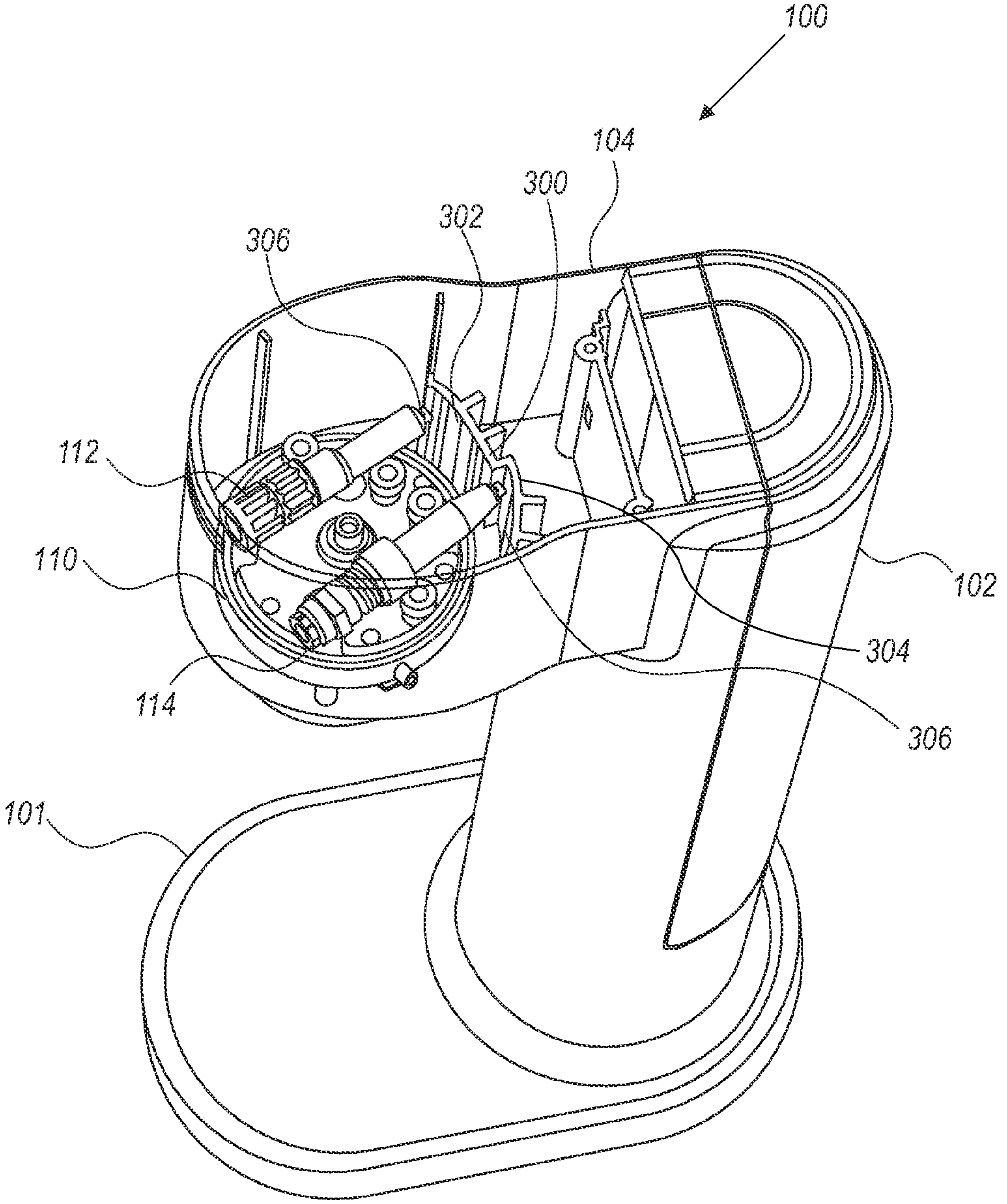
FIG. 4 is an upper view showing parts of the carbonation head of the carbonation machine shown in FIG. 1.

FIG. 4 is an upper view showing parts of the carbonation head of the carbonation machine shown in FIG. 1.

In some embodiments of the invention, a pressure release mechanism may be provided that includes an activator positioned adjacent to the rotatable carbonation head. In some embodiments of the invention, the activator may include a cam 300, for example, in the form of two inclined walls, each of which defines a tapered space between the cam and a respective plunger 306 (of either pressure release valves 112 and 114) that eventually ends at a position that ensures direct physical contact between the inclined wall and that plunger, when the carbonation head is rotated and reaches the release position. Thus, when carbonation is complete, and the user starts to rotate the bottle in the unscrewing direction, the carbonation head is rotated from the lock position to the release position. At that position, as a result of the plungers being depressed by the inclined walls, any excess pressure within the bottle is released. The locking teeth 202 that previously clutched to the rim 216 about the neck 212 of bottle 210 upon arrival at the corresponding recesses 204 may retract, releasing the rim of the bottle neck.

From that point on, the user may continue to unscrew the bottle until it is fully disengaged from the carbonation head and may be removed.

Figure 5A:
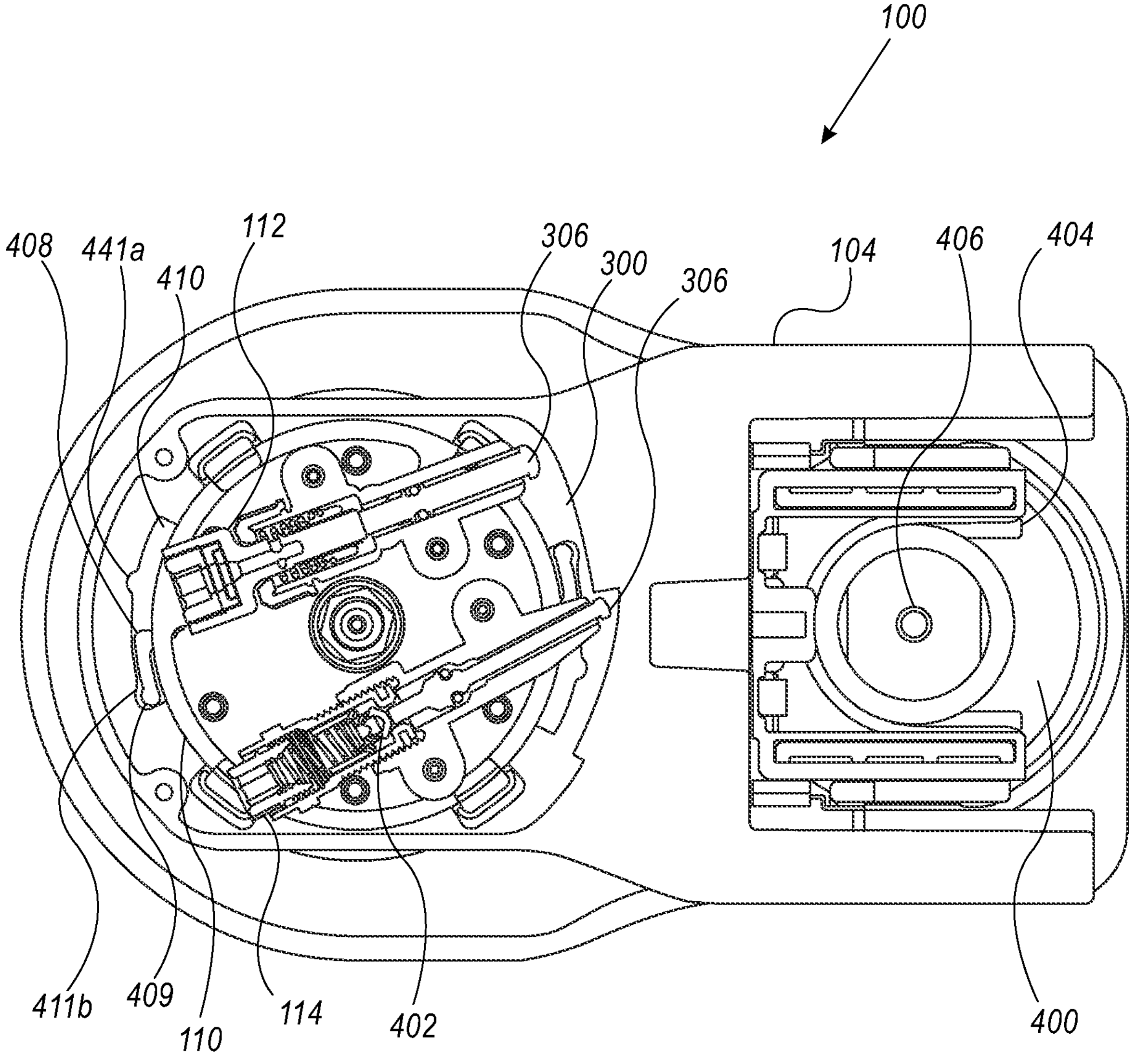
FIG. 5A is a top view the (transparent) upper portion of the carbonation machine of FIG. 1, showing cross-sections of the pressure release valves, with the carbonation head in a carbonation position.

FIG. 5A is a top view the (transparent) upper portion of the carbonation machine of FIG. 1, showing cross-sections of the pressure release valves 112 and 114, showing parts of the carbonation head when in the lock position.

Figure 5B:
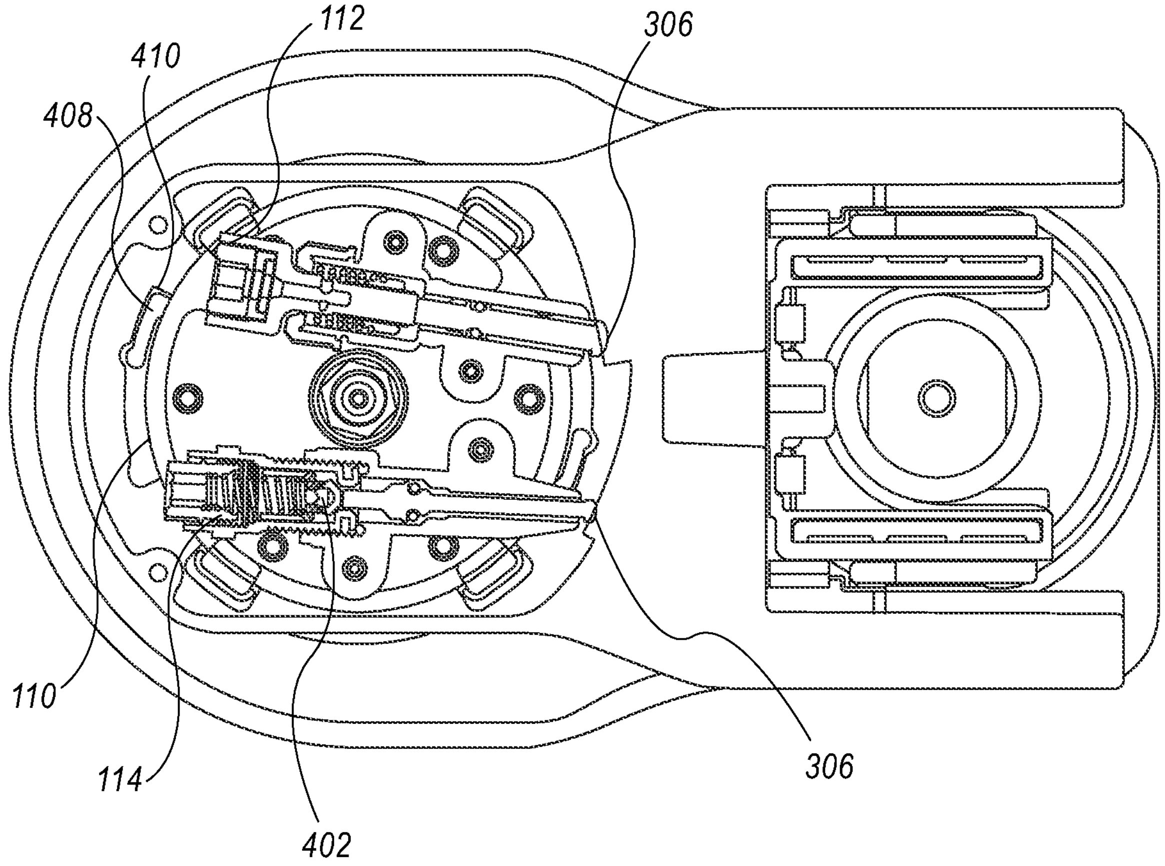
FIG. 5B is a top view the (transparent) upper portion of the carbonation machine of FIG. 1, showing cross-sections of the pressure release valves, with the carbonation head in an induced pressure release position.

FIG. 5B is a top view the (transparent) upper portion of the carbonation machine of FIG. 1, showing cross-sections of the pressure release valves 112 and 114, with the carbonation head in an induced pressure release position.

The top of gas canister 400 is shown, attached to gas canister mount 404. When the gas canister 400 is firmly mounted within the gas canister compartment 102 of carbonation machine 100, actuator pin 406 is configured, when operated, to release gas from gas canister 400, which gas flows, via designated piping, through the carbonation tube 108 into the bottle.

Pressing a carbonation button, a lever, or any such designated mechanical device for releasing gas from the gas canister, (not shown in the figures) causes compressed gas from within the gas canister to be released and to flow, via the piping and through the carbonation tube, into the water inside the bottle.

The rotation of the carbonation head 110 may be limited to a predetermined swivel sector by one or more limiters configured to constrain the sector of rotation to a predetermined angle range, e.g., 10-25 degrees, or other predetermined angle range. For example, carbonation head 110 may include a stopper 408, coupled to the rotatable carbonation head, the motion of which is confined within an arcuate groove 410 between two opposite ends of the groove defining the release position and the lock position.

Stopper 408 may include a protrusion 409 that matches either of two stop indents—first stop indent 411*a* and second stop indent 411*b* in the periphery of groove 410.

First stop indent 411*a* may be configured to retain protrusion 409 of stopper 408 that may slide into the first stop indent when the rotatable carbonation head 110 reaches the release position, while second stop indent 411*b* may retain protrusion 409 of stopper 408 that may slide into the second stop indent when the rotatable carbonation head 110 reaches the opposite end of the swivel sector, or other location on the swivel sector, in the lock position.

The stop indents 411*a* and 411*b* may be designed to cause the stopper 408 to snap into either of the lock or release position, offering enhanced sensory user experience. In some embodiments of the invention, the stopper and the groove may be designed to induce a clicking sound when the stopper snaps into the lock or release positions.

When the rotatable carbonation head is in the lock position, the plungers 306 of the pressure release valves 112 and 114 are spaced apart from the inclined walls of cam 300. When user turns the bottle in an attempt to unscrew it from the mount, first the rotatable carbonation head rotates to the release position at which point the plungers are depressed by the inclined walls of cam 300, causing poppet 402 of each of the pressure release valves 112 and 114 to free a passage in that valve, so as to allow excess pressure within the carbonated bottle to escape into ambient air.

Figure 6A:
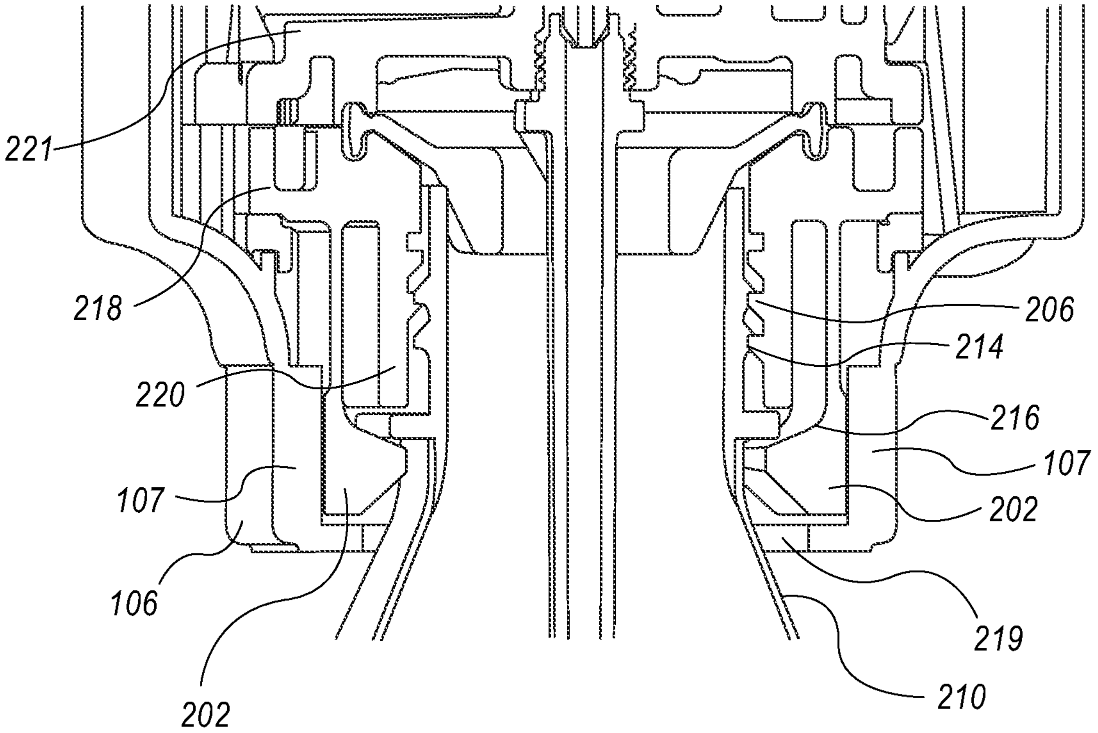
FIG. 6A is a cross-sectional view of the carbonation head of the carbonation machine shown in FIG. 1, with the locking teeth in a locked position.

FIG. 6A is a cross-sectional view of the carbonation head of the carbonation machine shown in FIG. 1, with the locking teeth in a locked position.

With the locking teeth 202 in the locked position, rim 216 on neck 212 of bottle 210 is retained between flange 220 and an upper surface of locking teeth 202 in an unreleasable position, as the internal wall 107 of mount 106 prevents locking teeth 202 from backing to release rim 216.

Figure 6B:
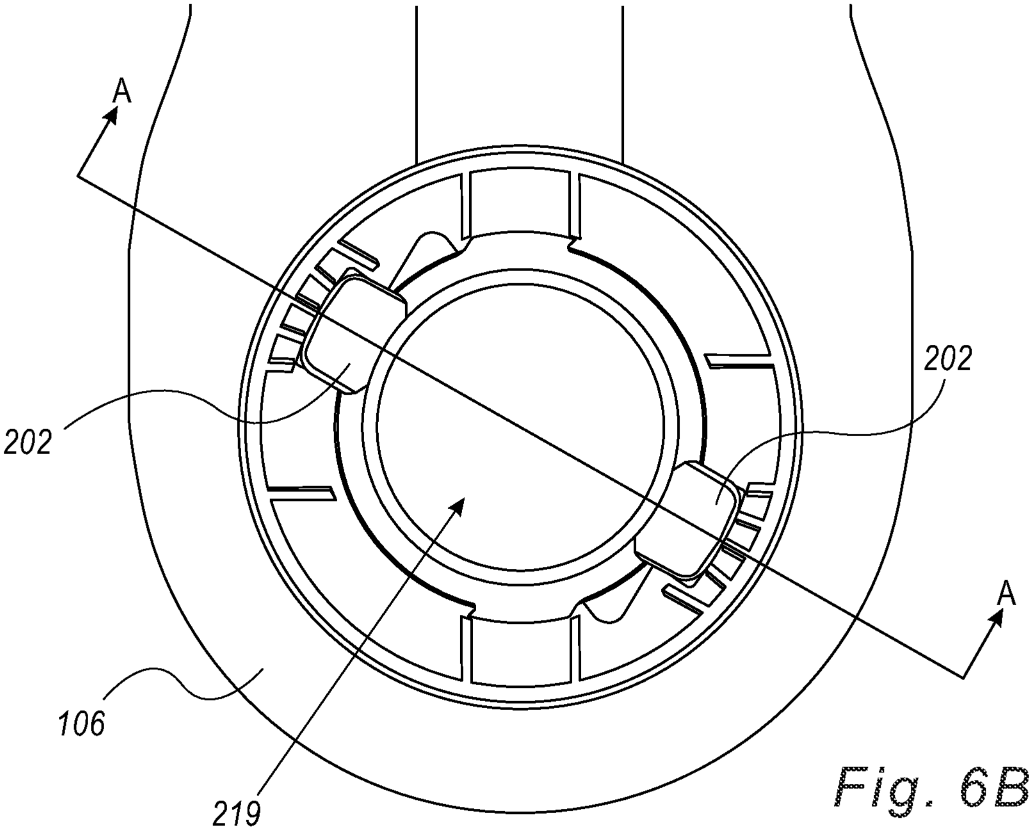
FIG. 6B is a bottom view of the mount of a carbonation head of the carbonation machine shown in FIG. 1, with the locking teeth in a locked position.

FIG. 6B is a bottom view of the mount of a carbonation head of the carbonation machine shown in FIG. 1, with the locking teeth 202 in a locked position (the cross-sectional view in FIG. 6A is presented along line A-A shown in FIG. 6B). The state of carbonation head 100 shown in FIG. 5A corresponds to this locked position.

Figure 6C:
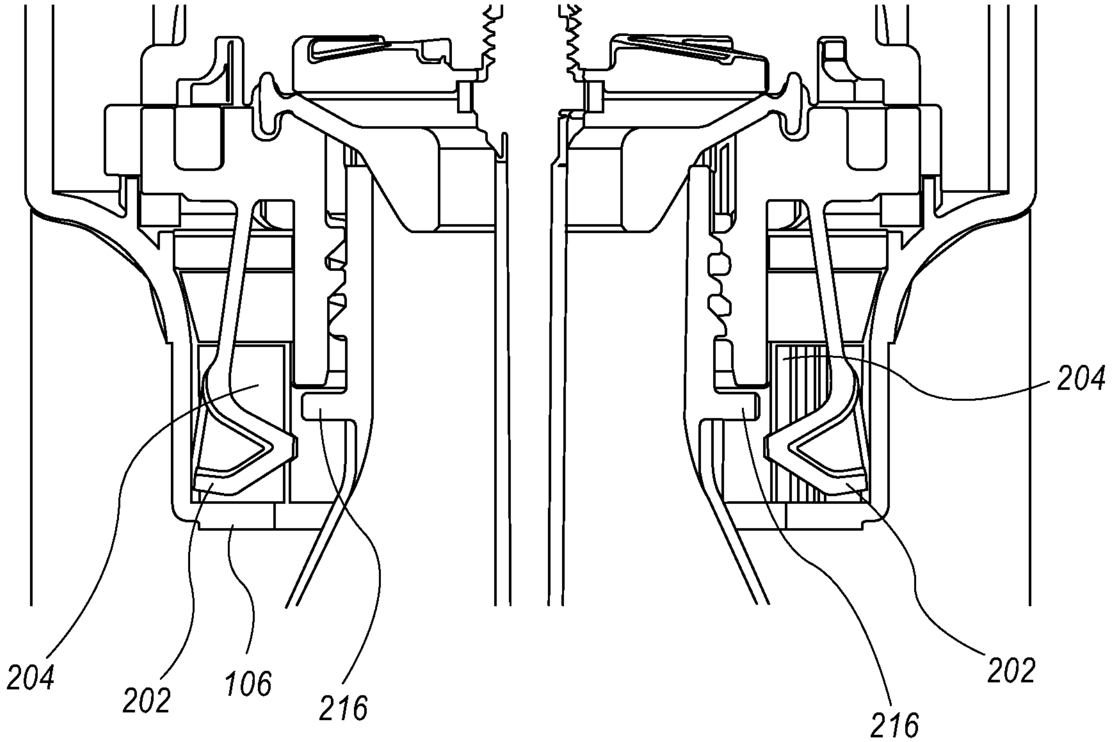
FIG. 6C is a cross-sectional view of the carbonation head of the carbonation machine shown in FIG. 1, with the locking teeth in an unlocked position.

FIG. 6C is a cross-sectional view of the carbonation head of the carbonation machine shown in FIG. 1, with the locking teeth in an unlocked position.

In this position, the locking teeth 202 are placed with a recess 204 in the wall of mount 106 behind each of the locking teeth. Thus, when the bottle is unscrewed off the carbonation head, rim 216 may press locking teeth 202 backwards into their corresponding recess 204, allowing the bottle neck 212 to be fully unscrewed and detached from the mount 106.

Figure 6D:
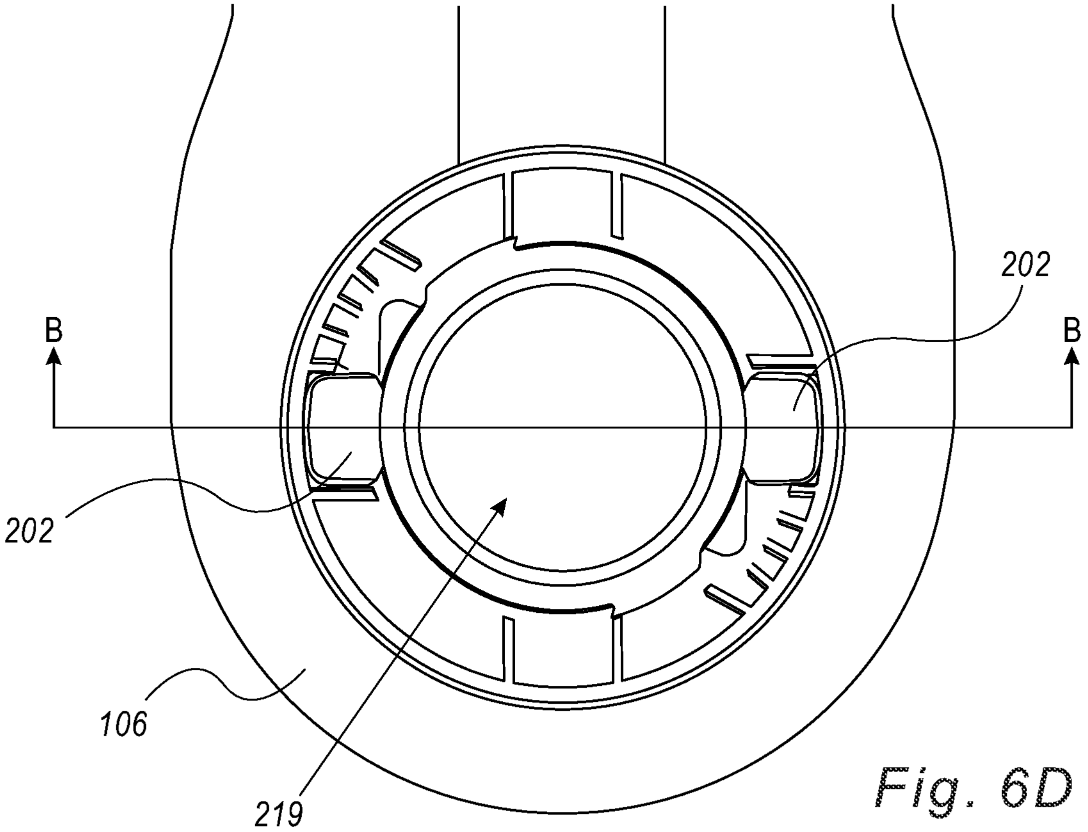
FIG. 6D is a bottom view of the mount of a carbonation head of the carbonation machine shown in FIG. 1, with the locking teeth in an unlock position.

FIG. 6D is a bottom view of the mount of a carbonation head of the carbonation machine shown in FIG. 1, with the locking teeth in an unlock position, showing the locking teeth and the enabling teeth retained in their corresponding recesses 204.

Figure 7A:
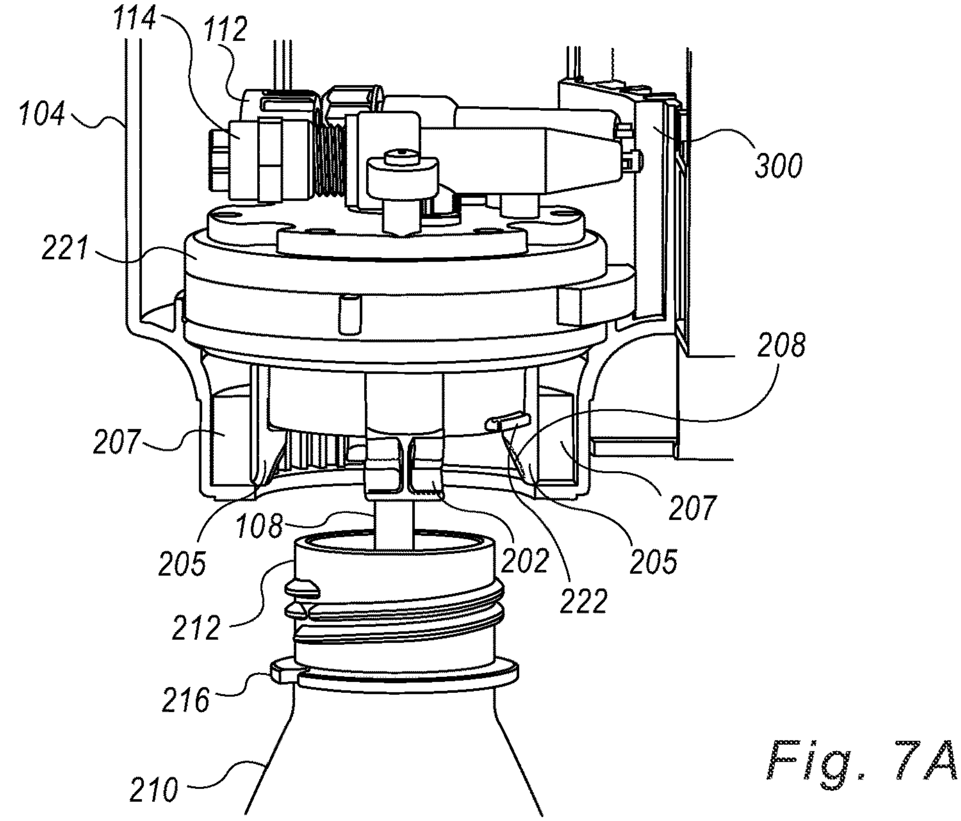
FIG. 7A is a cross-sectional view of the carbonation head of the carbonation machine shown in FIG. 1, with a bottle about to be inserted and screwed into the carbonation head mount, with the enabling teeth in a disabled position.

FIG. 7A is a cross-sectional view of the carbonation head of the carbonation machine shown in FIG. 1, with a bottle about to be inserted and screwed into the carbonation head mount, with the enabling teeth in a disabled position.

Figure 7B:
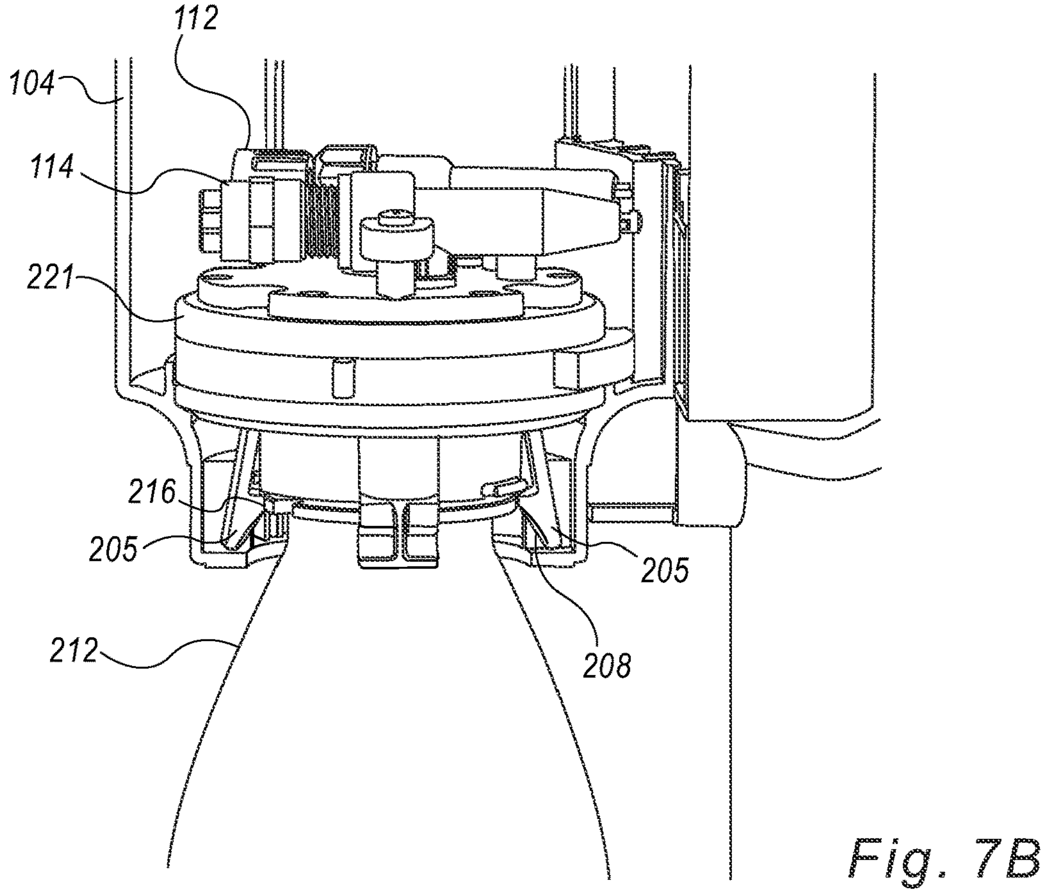
FIG. 7B is a cross-sectional view of the carbonation head of the carbonation machine shown in FIG. 1, with a bottle fully screwed into the carbonation head mount, with the enabling teeth in a disabled position.

FIG. 7B is a cross-sectional view of the carbonation head of the carbonation machine shown in FIG. 1, with a bottle fully screwed into the carbonation head mount, with the enabling teeth in a disabled position.

The purpose of the enabling teeth 205, according to some embodiments of the present invention, is to prevent the rotation of the carbonation head during screwing of the bottle, or as a result of tampering with the carbonation head, except for when the bottle neck 212 is substantially fully screwed onto the mount. As long as the rim 216 of bottle 210 is pressed against enabling teeth 205, the bottle may be screwed without rotating the carbonation head. The rotation of the carbonation head is prevented by stopper 222—a protrusion on the carbonation head mount that is blocked by the body of teeth 205, preventing the rotation of the carbonation head.

Only when rim 216 presses against enabling teeth 205, the enabling teeth 205 retract and make way for stopper 222 to pass in the gap, thus allowing the rotation of the carbonation head.

The enabling teeth 205 may present an inclined front surface 208 defining a tapered gap between the enabling tooth body to the carbonation head mount. Thus, only when rim 216 of bottle 210 reaches the highest screwed position—when fully screwed into the mount—rim 216 presses against teeth 205, pushing them back into recess 207 to form a gap between the teeth and the carbonation head, thereby allowing the carbonation head to rotate.

Thus, when a bottle is inserted into the mount and screwed into (or onto) the flange 220 of the carbonation head 110 (the carbonation head being initially in the release position), the carbonation head does not rotate until the bottle is firmly screwed in, as long as the enabling teeth remain in their initial position. When the bottle reaches a fully screwed position, the rim 216 on the neck 212 of the bottle 210 pushes against enabling teeth 205, thereby releasing the stopper 222 on the carbonation head, so that the final screwing motion applied by the user on the bottle causes the carbonation head to rotate to the lock position (see also FIG. 5A and FIG. 5B and corresponding description in the present specification). When the carbonation head is in the lock position, carbonation may be performed, when the user activates the carbonation button or similar mechanism. The user may then rotate the bottle in the opposite direction to unscrew the bottle and release the bottle from the mount.

Following is an index of elements shown in the figures:

100—carbonation machine;
101—base;
102—gas canister compartment;
103—support surface;
104—housing;
106—mount;
107—internal wall surface;
108—carbonation tube;
110—carbonation head;
112—pressure release valve;
114—safety pressure release valve;
202—locking tooth;
204—recess;
205—enabling tooth;
206—internal thread;
207—recess
208—inclined surface of enabling tooth;
210—bottle;
212—bottle neck;
214—external thread;
216—rim;
218—flange base;
219—mount opening;
220—flange;
221—carbonation head top;
222—limiter
300—cam;
302—first inclined wall;
304—second inclined wall;
306—plunger;
400—gas canister;
402—poppet;
404—gas canister mount;
406—gas canister outlet;
408—stopper;
409—protrusion;
410—groove;
411*a*—first stop indent;
411*b*—second stop indent;

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A carbonation machine comprising:
a rotatable carbonation head including:
at least one pressure release valve,
a carbonation tube connectable via piping to a gas canister, and
a flange for engaging a neck of a bottle filled with liquid to be carbonated by screwing the neck into or onto the flange to firmly hold the bottle with the carbonation tube maintained inside the bottle, and for disengaging the neck of the bottle from the flange by unscrewing the neck off the flange,
the rotatable carbonation head being configured, when the neck is being screwed into or onto the flange, to be rotated from a release position to a lock position, and being configured, when the neck is being unscrewed off the flange, to be rotated from the lock position to the release position,
wherein, in the release position, said at least one pressure release valve is operated to open so as to release excess pressure if such excess pressure exists in the bottle, and
wherein, in the lock position, said at least one pressure valve remains closed.

2. The carbonation machine of claim 1, wherein said at least one pressure release valve comprises two pressure release valves.

3. The carbonation machine of claim 1, further comprising an activator to operating said at least one pressure release valve.

4. The carbonation machine of claim 3, wherein the activator is configured to operate said at least one pressure release valve by depressing a plunger of each of said at least one pressure release valves.

5. The carbonation machine of claim 4, wherein the activator further comprises a cam adjacent to the rotatable carbonation head including at least one inclined wall defining a tapered space between the cam and the plunger of each of said at least one pressure valve that comes into physical contact with the plunger, when the carbonation head is in the release position.

6. The carbonation machine of claim 1, wherein the carbonation head is confined when rotated to a swivel sector.

7. The carbonation machine of claim 6, wherein the carbonation head is in the release position when the carbonation head is rotated to a first end of the swivel sector.

8. The carbonation machine of claim 7, wherein the carbonation head is in the lock position when the carbonation head is rotated away from the first end of the swivel sector.

9. The carbonation head of claim 8, wherein the carbonation head is in the lock position when the carbonation head is rotated to a second end of the swivel sector.

10. The carbonation head of claim 1, wherein a plurality of locking teeth is provided to clutch to a rim protruding laterally from the neck of the bottle, when the carbonation head is in the lock position.

11. The carbonation machine of claim 10, further comprising a wall surface surrounding the flange, for preventing retraction of the locking teeth, and for retaining the neck clutched by the locking teeth.

12. The carbonation machine of claim 10, wherein recesses are provided in the wall surface surrounding the flange, such that, when the carbonation head is rotated to the release position, the locking teeth are allowed to retract into the recesses and release the laterally protruding rim of the neck of the bottle.

13. The carbonation machine of claim 1, wherein a stopper is provided coupled to the rotatable carbonation head, confined to move within a groove, wherein opposite ends of the groove define the lock position and the release position.

14. The carbonation head of claim 13, wherein the groove is provided with a first indent in a periphery thereof, such that a protrusion on the stopper slides into the first indent when the carbonation head reaches the release position.

15. The carbonation head of claim 14, wherein the groove is provided with a second indent in a periphery thereof, such that a protrusion on the stopper slides into the second indent when the carbonation head is rotated to the lock position.

16. The carbonation machine of claim 1, further comprising a housing mounted on a base, provided with a gas canister compartment, wherein the housing includes a lateral extension suspended over the base and housing the carbonation head.

17. The carbonation machine of claim 1, wherein the carbonation head is configured to be rotated only when the bottle is fully screwed into or onto the flange.

18. The carbonation machine of claim 17, further comprising one or a plurality of enabling teeth for facilitating rotation of the carbonation head only when the bottle is fully screwed into or onto the flange.

19. A rotatable carbonation head comprising:

at least one pressure release valve, a carbonation tube connectable via piping to a gas canister, and a flange for engaging a neck of a bottle filled with liquid to be carbonated by screwing the neck into or onto the flange to firmly hold the bottle with the carbonation tube maintained inside the bottle and for disengaging the neck of the bottle from the flange by unscrewing the neck off the flange, wherein the rotatable carbonation head is configured, when the neck is screwed into or onto the flange, to be rotated from a release position to a lock position, and being configured, when the neck is unscrewed off the flange, to be rotated from the lock position to the release position, wherein, in the release position, said at least one pressure release valve is operated to open so as to release excess pressure if such excess pressure exists in the bottle, and wherein, in the lock position, said at least one pressure valve remains closed.

20. The rotatable carbonation head of claim 19, wherein the carbonation head is configured to be rotated only when the bottle is fully screwed into or onto the flange.

* * * * *